United States Patent [19]

Aucsmith

[11] Patent Number: 5,915,018
[45] Date of Patent: Jun. 22, 1999

[54] KEY MANAGEMENT SYSTEM FOR DVD COPYRIGHT MANAGEMENT

[75] Inventor: David Wayne Aucsmith, Portland, Oreg.

[73] Assignee: Intel Corporation, Santa Clara, Calif.

[21] Appl. No.: 08/740,976

[22] Filed: Nov. 5, 1996

[51] Int. Cl.[6] .............................. H04L 9/00; H04L 9/30; H04N 7/162

[52] U.S. Cl. ................... 380/4; 380/5; 380/9; 380/10; 380/23; 380/25; 380/30; 380/49; 380/50; 705/1

[58] Field of Search .................... 380/3, 4, 5, 9, 380/10, 20, 21, 23, 49, 50, 59, 30; 705/1, 7, 8, 26, 500

[56] References Cited

U.S. PATENT DOCUMENTS

| | | | |
|---|---|---|---|
| 4,991,208 | 2/1991 | Walker et al. | 380/20 |
| 5,440,631 | 8/1995 | Akiyama et al. | 380/4 |
| 5,596,639 | 1/1997 | Kikinis | 380/4 |
| 5,615,264 | 3/1997 | Kazmierczak et al. | 380/4 |
| 5,659,613 | 8/1997 | Copeland et al. | 380/3 |
| 5,699,434 | 12/1997 | Hogan | 380/49 |
| 5,721,778 | 2/1998 | Kubota et al. | 380/10 |
| 5,754,648 | 5/1998 | Ryan et al. | 380/4 |
| 5,754,649 | 5/1998 | Ryan et al. | 380/4 |
| 5,825,876 | 10/1998 | Peterson, Jr. | 380/4 |

*Primary Examiner*—Bernarr E. Gregory
*Attorney, Agent, or Firm*—Ray J. Werner

[57] ABSTRACT

A cryptographic system and method for secure distribution and management of cryptographic keys for use in a DVD copy protection scheme is disclosed. A DVD disc having compressed, encrypted content written on a first portion of the disc, and the content encryption key, itself encrypted with a second key and written out of band on a second portion of the disc is used to provide content, key, and control information to a DVD drive according to the present invention. The DVD drive is coupled to a decompressor and a video controller. The video controller and DVD drive engage in a handshaking protocol in which all of the communication between them is encrypted. After verifying that the video controller is registered and not known to be compromised, the DVD drive passes the content key and control information to the video controller, and the compressed, encrypted content to the decompressor. The content decompressed by the decompressor is communicated to the video controller where it is decrypted and converted to video signals. The control information instructs the video controller as to whether an optional analog protection scheme should be applied to the video signals prior to delivering the video signals to the display.

20 Claims, 4 Drawing Sheets

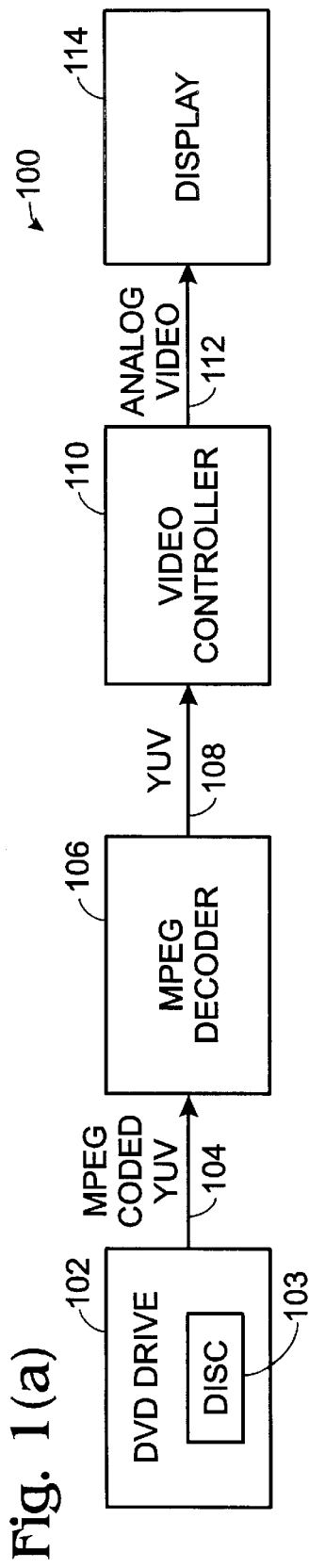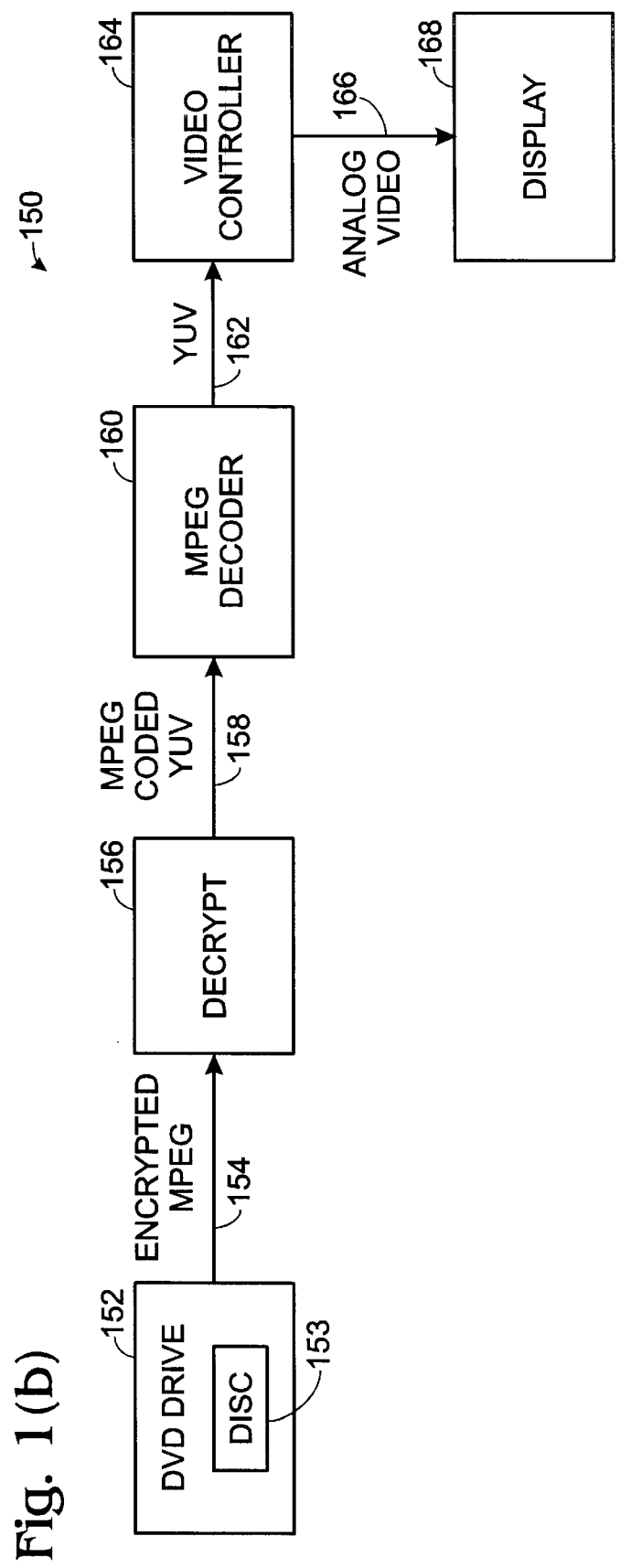
Fig. 1(a)
Fig. 1(b)

KEY MANAGEMENT SYSTEM FOR DVD COPYRIGHT MANAGEMENT

BACKGROUND OF THE INVENTION

1. Field of the Invention

The present invention relates to the secure distribution of digital content and more particularly to a key management and exchange mechanism for copy protection of digital content provided on Digital Video Disc (DVD).

2. Background

Rapid advances in recording and playback technology have led from analog video cassette tapes and video cassette tape players, to digitized video available on optical disks. Digitized video on optical disks is typically referred to as being in compact disk (CD) format. Digital video can be played back on a television with the aid of special hardware, or played back on the video display device of a general purpose computer such as a personal computer (PC). Digitized video is typically compressed so that the available data storage capacity of the CD is used most efficiently. Several schemes for compression and decompression of digitized video have been adopted for use in industry such as the Indeo® format developed by Intel Corp., of Santa Clara, Calif., and the family of MPEG specifications for video/audio compression and decompression developed by committee of the International Standards Organization (ISO).

Even with the various compression techniques that are available, it has not been possible to record full-length motion pictures on CDs. However, a new recording format for optical disks has been developed that makes it possible to store a full-length motion picture encoded as compressed digital information. DVDs are optical disks having compressed video (and audio) data recorded thereon in this new format.

The development of DVD technology has led to a substantial interest in the computer and entertainment industries in incorporating video data into multimedia and related applications for use in home entertainment equipment such as consumer players, as well as in personal computers. Potential growth in this area has been triggered by DVD technology because the storage capacity offered by the DVD format enables placing a typical full-length motion picture, in its entirety, on a single disc.

With the compressed data of an entire movie readily available in a single disc, content providers are extremely concerned with the possibility of unauthorized copying of the content. In view of this challenge, various schemes for achieving copy protection, including but not limited to encryption of the content have been proposed.

FIGS. 1(a)–1(b) illustrate the vulnerability of content to observation and unauthorized copying.

FIG. 1(a) shows a DVD playback system 100 in which a DVD drive 102, reads a DVD disc 103 to produce MPEG coded YUV data 104 as an output. DVD drive 102 is coupled to an MPEG decoder 106 so as to communicate MPEG coded YUV data 104 from DVD drive 102 to MPEG decoder 106. MPEG decoder 106 operates on MPEG coded YUV data 104 so as to produce decompressed YUV data 108 as an output. MPEG decoder 106 is coupled to a video controller 110 so as to communicate YUV data 108 from MPEG decoder 106 to video controller 110. Video controller 110 operates on YUV data 108 to produce analog video 112 as an output. Video controller 110 is coupled to a display 114 so as to communicate analog video 112 from video controller 110 to display 114. In this configuration, MPEG coded YUV data 104, YUV data 108, and analog video 112 are all unencrypted and susceptible to unauthorized copying.

As illustrated in FIG. 1(b), even encrypting the MPEG coded YUV data does not solve the problem. In FIG. 1(b) a DVD playback system 150 is shown in which a DVD drive 152, reads a DVD disc 153 to produce encrypted MPEG coded YUV data 154 as an output. DVD drive 152 is coupled to a decryptor 156 so as to communicate encrypted MPEG coded YUV data 154 from DVD drive 152 to decryptor 156. Decryptor 156 operates on encrypted MPEG data 154 to produce MPEG coded YUV data 158 as an output. The MPEG coded YUV data output of decryptor 156 is communicated to an MPEG decoder 160. MPEG decoder 160 operates on MPEG coded YUV data 158 so as to produce decompressed YUV data 162 as an output. MPEG decoder 160 is coupled to a video controller 164 so as to communicate YUV data 162 from MPEG decoder 160 to video controller 164. Video controller 164 operates on YUV data 162 to produce analog video 166 as an output. Video controller 164 is coupled to a display 168 so as to communicate analog video 166 from video controller 164 to display 168. In this configuration, MPEG coded YUV data 158, YUV data 162, and analog video 166 are all unencrypted and susceptible to unauthorized copying.

Currently, all proposed encryption schemes for DVD copy protection use global secrets. An example of a copy protection scheme which uses a global secret is one that uses one or more non-keyed algorithms to either disrupt analog gain control or directly invert the luminance in a YUV data frame. All non-keyed transforms have what is effectively a global secret, i.e., knowledge of the algorithm employed by the transform. Once that algorithm is known then the entire system is compromised. This should be contrasted with cryptography which assumes that an adversary has knowledge of the algorithm and the output but does not know the key of the transform. As long as the key remains secret then the transform is secure. In most cryptographic systems key management becomes the central issue.

What is needed is a system and method for receiving compressed, encrypted YUV data and decompressing and decrypting that YUV data without exposing decrypted data or cryptographic keys to observation.

SUMMARY OF THE INVENTION

A cryptographic system and method for secure distribution and management of cryptographic keys for use in a DVD copy protection scheme is disclosed. A DVD disc having compressed, encrypted content written on a first portion of the disc, and the content encryption key, itself encrypted with a second key and written out of band on a second portion of the disc is used to provide content, key, and control information to a DVD drive according to the present invention. The DVD drive is coupled to a decompressor and a video controller. The video controller and DVD drive engage in a handshaking protocol in which all of the communication between them is encrypted. After verifying that the video controller is registered and not known to be compromised, the DVD drive passes the content key and control information to the video controller, and passes the compressed, encrypted content to the decompressor. The content decompressed by the decompressor is communicated to the video controller where it is decrypted and converted to video signals. The control information instructs the video controller as whether an optional analog protection scheme should be applied to the video signals prior to delivering the video signals to the display.

BRIEF DESCRIPTION OF THE DRAWINGS

FIG. 1(a) is a block diagram of a system for playing video from DVD showing where access to content has not been made secure.

FIG. 1(b) is a block diagram of a system for playing video from DVD which includes encrypted MPEG format data which shows where access to content has not been made secure.

DETAILED DESCRIPTION

Figure 2:
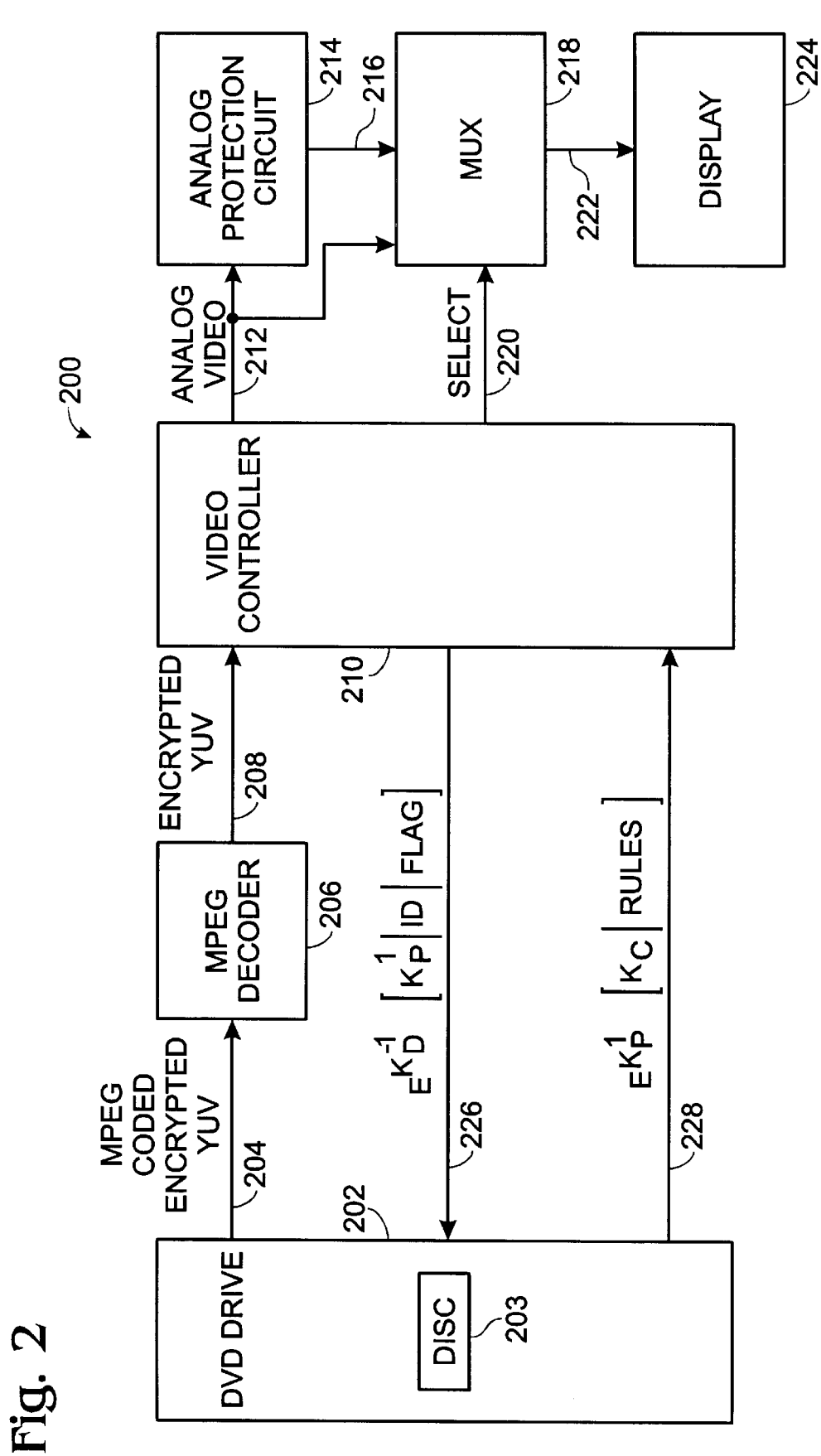
FIG. 2 is a block diagram of a system according to the present invention where access to content has been made secure.

An illustrative embodiment of the present invention is described in terms of a system for playing video from a DVD format disc having an MPEG coded version of encrypted YUV data stored thereon, together with encrypted keys, and encrypted rules. Those skilled in the art will recognize that other disc formats and compression codings can be used.

Terminology

Content provider refers to an entity that provides the source material to be recorded and replayed using a system such as a DVD drive.

Information handling system refers to any aggregation of hardware or hardware and software, that processes or transforms information in either the digital or analog domain. A personal computer is an example of an information handling system.

MPEG stands for the Motion Picture Experts Group, which is a committee of the International Standards Organization (ISO) that generates standards for digital video and audio compression. MPEG is also commonly used as the name of the algorithms developed or adopted by this group. MPEG-1 is optimized for CD-ROM, MPEG-2 for broadcast quality video, and MPEG-4 for low bandwidth video telephony. MPEG-1 uses discrete cosine transform (DCT) and Huffman coding to remove spatially redundant data within a frame and block-based motion compensated prediction to remove data which is temporally redundant between frames. Audio is compressed using subband encoding. These algorithms allow better than VHS quality video and almost CD quality audio to be compressed onto and streamed off a single speed CD-ROM drive. MPEG encoding can introduce blockiness, color bleed and shimmering effects on video and lack of detail and quantization effects on audio. The official name of MPEG-1 is IS-11172. MPEG-2 is a video and audio compression algorithm and file format, optimized for broadcast quality video. MPEG-2 has been approved as International Standard IS-13818, by ISO.

MPEG decoder refers to a system or device that decompresses MPEG format data to obtain original form of that data prior to its compression. MPEG decoders can be hardware, software or a combination of hardware and software.

Out of band refers to data written on a DVD disc in such a way that it cannot be addressed by normal program logic. In other words, the out of band data can be accessed by the DVD drive itself but cannot be requested by the system of which the DVD drive is a part. This out of band feature provides for protected data storage. In accordance with the present invention, out of band data is not transferred out of the DVD drive.

Player, as used herein, refers to a device that, when so instructed, reads at least a portion of a machine readable medium. The term has been adapted from the "record player" of earlier phonorecord technology. A hard disk drive, a CD-ROM drive, and a DVD drive, are examples of players. As used herein, these terms refer not simply to the mechanical "drives" but also include the electronics necessary to perceive the data recorded on the machine readable media.

Public key cryptography refers to an asymmetric encryption/decryption scheme, where each person gets a pair of keys, called the public key and the private key. Each person's public key is published while the private key is kept secret. Messages are encrypted using the intended recipient's public key and can only be decrypted using the intended recipient's private key. The need for sender and receiver to share secret information (i.e., keys) via a secure channel is eliminated since all communications involve only public keys, and no private key is ever transmitted or shared. Public key cryptography can be used for authentication (digital signatures) as well as for privacy (encryption).

Rules, or rule set, as used herein, is an alternative way to refer to the list of capabilities and features that a video controller must posses in order for playback to be initiated. This list of capabilities and features is typically specified by the out of band data on a DVD disc.

Rules flag, as used herein, is an alternative way to refer to information communicated to a DVD drive from a video controller which indicates the available capabilities and features of that particular video controller.

VHS stands for Video Home System and refers to a format for recording audio and video information.

Video controller refers to a physical device which, at a minimum, receives data, processes that data, and generates the video signals needed to create an image on a display device. In addition to video image signals, video controllers typically supply control signals such as vertical and horizontal sync signals.

YUV refers to a luminance chrominance format in which video information can be represented.

Notation

The following notation is used to represent several of the cryptographic and data processing steps described in the illustrative embodiment of the present invention.

X|Y|Z   X is concatenated with Y concatenated with Z $E^{K_C}[M]$   M is encrypted with key $K_C$ $D^{K_C}[C]$   C is decrypted with key $K_C$ where:

$K_C$ is a symmetric key;

$K_P^1$ is a public key of the key pair $K_P^1$, $K_P^{-1}$; and $K_P^{-1}$ is a private key of the key pair $K_P^1$, $K_P^{-1}$.

A symmetric key cryptographic operation is represented as:

$$E^{K_C}[M]=C \rightarrow D^{K_C}[C]=M$$

A public-key cryptographic operation is represented as:

$$E^{K_P^1}[M]=C \rightarrow D^{K_P^{-1}}[C]=M$$

OR $$E^{K_P^{-1}}[M]=C \rightarrow D^{K_P^1}[C]=M$$

As used herein:
$K_D{}^1$=DVD public key
$K_D{}^{-1}$=DVD private key
$K_C$=content key
$K_P{}^1$=video controller public key
$K_P{}^{-1}$=video controller private key System Configuration Referring to FIG. 2, a DVD playback system 200 is described to illustrate an embodiment of the present invention.

A DVD drive 202 contains the DVD Consortium public key $K_D{}^1$. DVD drive 202 is supplied with a DVD disc 203. DVD drive produces as an output, an MPEG coded, encrypted YUV data stream 204. This data is communicated to an MPEG decoder 206. Those skilled in the art will recognize that any decompressor suitable to decompress the data presented to it can be used in the present invention. Data stream 204 may go directly to MPEG decoder 206 ormay be temporarily stored, or buffered, in a memory (not shown) before being received by MPEG decoder 206. MPEG decoder 206 may be implemented in hardware, software or some combination of hardware and software. MPEG decoder 206 produces, as an output, an encrypted YUV data stream 208 which is communicated to a video controller 210.

Video controller 210 contains the YUV decryption engine and also both the video controller's private key KP-1 and the encrypted string containing the video controller's public key $K_P{}^1$, ID, and rule flag. This string was encrypted using the DVD consortium private key $K_D{}^{-1}$. The rule flag identifies the capabilities and features of video controller 210. These rules may include the capability of protecting the analog video output signal. Video controller 210 produces, as outputs, an analog video signal 212, and a select signal 220. Analog video signal 212 is coupled to an analog protection circuit 214 which operates of analog video signal 212 to produce modified analog video signal 216. Modified analog video signal 216 is capable of driving the video display but is not suitable for making unauthorized copies. Examples of operations that analog protection circuit 214 may perform are disruption of gain control, and inversion of luminance information.

Select signal 220, analog video 212 and modified analog video 216 are all coupled to mux 218. Select signal 220 controls which one of analog video 212 and modified analog video 216 are passed to a display 224. Display 224 may be any suitable device for displaying video information, for example a cathode ray tube (CRT) type monitor or a liquid crystal display (LCD) type monitor. Televisions and computer displays can each be manufactured using either CRT or LCD displays. Those skilled in the art will recognize that analog protection circuit 214 and mux 218 can be physically incorporated, i.e., integrated into the video controller, and do not necessarily need to be physically separate modules.

A communication path 226 exists between video controller 210 and DVD drive 202 for transferring, in encrypted form, the public key, identification number (ID), and rules flag of video controller 210, from video controller 210 to DVD drive 202. This communication path may be any suitable means of communication including but not limited to, a single wire, a multi-wire path, a radio frequency or an infrared wireless transmitter/receiver pair, one or more optical fibers, a bus, a buffer memory with appropriate read/write controls and pathways, and so on. Those skilled in this art will recognize how to construct these and other equivalent means of transferring data from video controller 210 to DVD drive 202.

A communication path 228 exists between DVD drive 202 and video controller 210 for transferring, in encrypted form, the content key, and rules from DVD drive 202 to video controller 210. This communication path may be any suitable means of communication including but not limited to, a single wire, a multi-wire path, a radio frequency or an infrared wireless transmitter/receiver pair, one or more optical fibers, a bus, a buffer memory with appropriate read/write controls and pathways, and so on. Those skilled in this art will recognize how to construct these and other equivalent means of transferring data from DVD drive 202 to video controller 210.

Those skilled in the art will also recognize that communication path 226 and communication path 228 may be the same path.

DVD Disc

Figure 3:
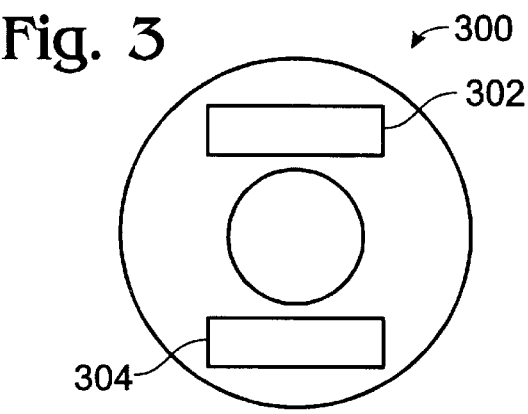
FIG. 3 illustrates a DVD disc having a first portion of data encrypted under a first key and a second portion of data, written out of band and encrypted under a second key, according to the present invention.

A DVD disc 300 according to the present invention is shown in FIG. 3. A first portion 302 of disc 300 has data encrypted with a first key. A second portion 304 of disc 300 has the first key encrypted with a second key. Second portion 304 is written out of band.

In addition to the first key, second portion 304 typically includes control information, which is encrypted with $K_D{}^{-1}$, such as a set of rules and a list of compromised video controllers. The rules describe what sort of video controller is allowed access to the content, such as software versus hardware and whether analog protection is to be applied to the analog output of the video controller. The list of comprised video controllers typically contains video controller ID numbers.

System Operation—Key Management

Operation of the system, including a general protocol for moving the content key $K_C$ from the disc through the drive and ultimately to the video controller is described with reference to FIGS. 2–4.

A cryptographic service provider, referred to herein as a DVD Consortium, maintains a private key $K_D{}^{-1}$. This private key is used to perform three services. The first service is to provide the corresponding public key member to DVD drive manufacturers for their use in authentication. The second service is to encrypt individual DVD content keys, $K_C$ for content owners using the private key $K_D{}^{-1}$. The third service is to encrypt video controller public keys, $K_P{}^1$, for registered video controllers using the private key $K_D{}^{-1}$.

DVD disc 203 has content thereon which is encrypted under a key $K_C$, where key $K_C$ is typically randomly generated. DVD disc 203 also has thereon, an encrypted version of key $K_C$, where the encryption is under the DVD Consortium private key. The encrypted key $K_C$, and other control information which is encrypted with the DVD Consortium private key, is written onto the disc as out of band data. In the illustrative embodiment, the content is a digitized motion picture, however any digitized video content is suitable for use with the present invention.

Figure 4A:
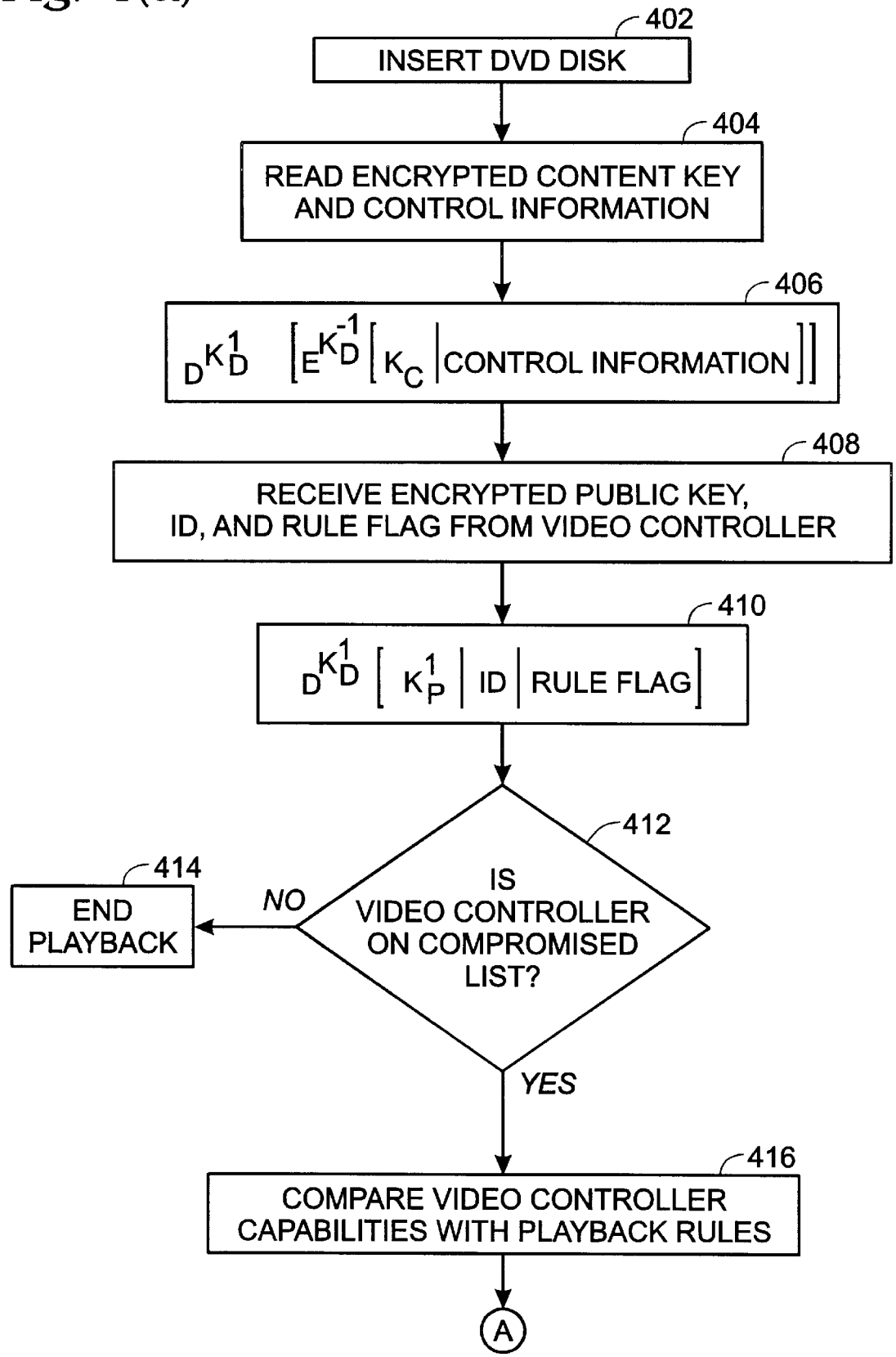
FIGS. 4(a)–(b) are flowcharts showing the process by which a DVD drive, decoder, and video controller communicate.
Figure 4B:
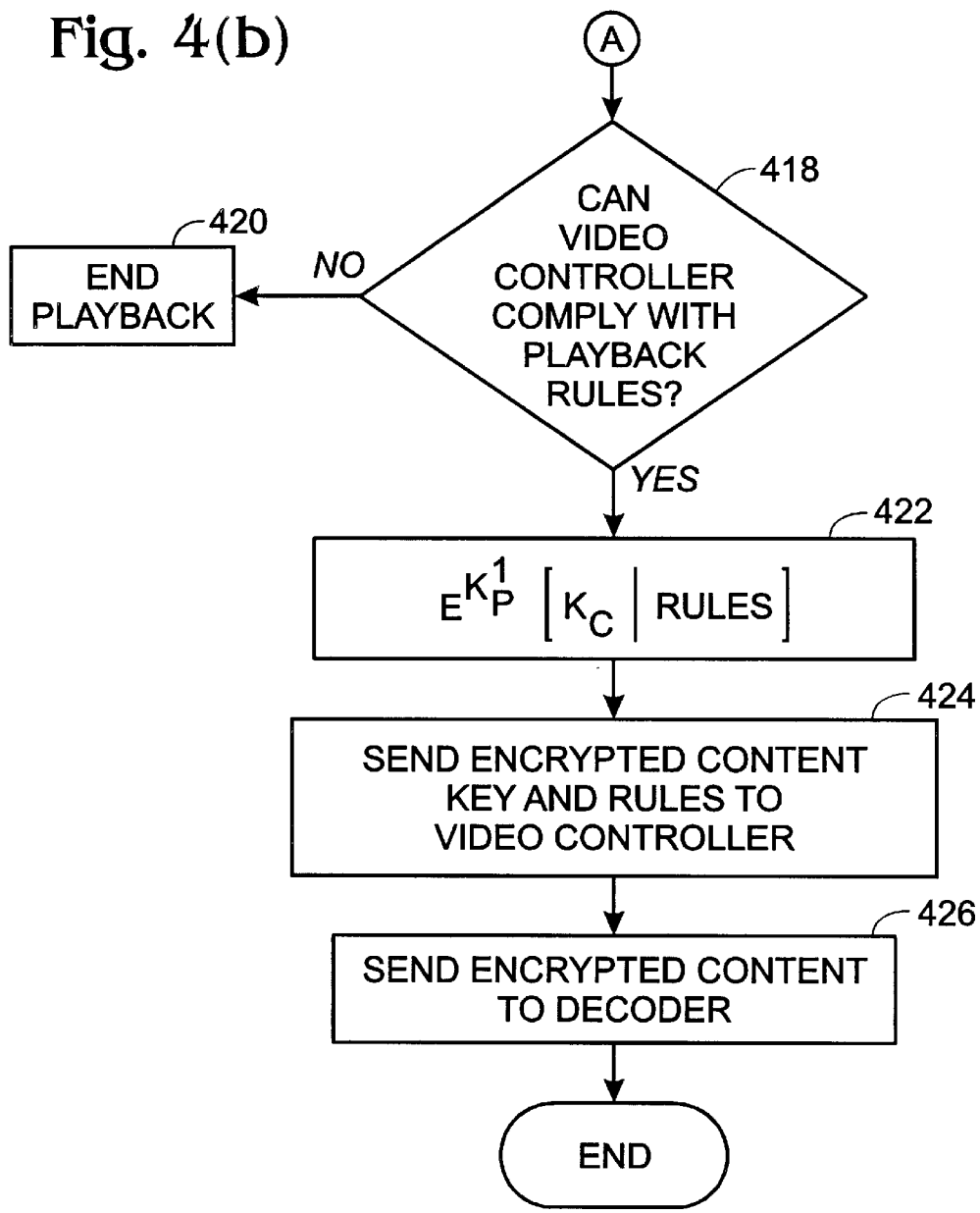

Referring to FIG. 4(a), the process begins with a step 402 in which DVD disc 203 is inserted into DVD drive 202. Alternatively, DVD disc 203 may have been present in DVD drive 202 and the process is initiated by a "play" command being issued to the DVD drive.

In a step 404 DVD drive 202 reads an encrypted content key $K_C$, and encrypted control information from the out of band portion of DVD disc 203. The content key and control information are typically encrypted with the private key of a key pair. This private key may be maintained by an organization which performs the encryption for content providers. The control information typically includes the capabilities and features that are required to be present in the video controller for proper playback. The control information also typically includes a list of IDs which specify compromised video controllers.

In a step 406 DVD drive 202 decrypts the content key and control information that was read from the out of band portion in step 404. The decryption is performed with the public key of a key pair.

In a step 408 DVD drive 202 receives from video controller 210 an encrypted public key, and encrypted control information. Those skilled in the art will recognize that many methods of initiating communication between DVD drive 202 and video controller 210 are possible. One way to initiate this communication is for DVD drive 202 to request this information from video controller 210 when DVD drive 202 receives a play command. Alternatively, DVD drive may request this information from video controller 210 when the system of which these elements are a part is powered up or reset. In still further alternative embodiments of the present invention, DVD drive 202 may request this information from video controller 210 periodically and/or aperiodically, before, or before and during the playback of the content of a DVD disc.

Typically the encrypted control information communicated from video controller 210 to DVD drive 202 includes the ID of video controller 210 and the rule flag, i.e., the set of capabilities and features, of video controller 210. The rule flag may include fields that are reserved for features or capabilities to be introduced in video controllers of the future. The video controller public key, ID, and rule flag are encrypted, prior to being communicated to DVD drive 202, with a private key of a key pair. Typically, this information is encrypted and then stored in video controller 210 as part of the manufacturing process used to make video controller 210.

In a step 410 DVD drive 202 decrypts the encrypted public key and control information that was received from video controller in step 408.

In a step 412 a determination is made as to whether video controller 210 is on a list on compromised video controllers. This determination is made by comparing the ID of video controller 210 to a list of bad video controllers obtained from the out of band control information in step 404. If video controller 210 is determined to unacceptable for the playback of the content of DVD disc 203 then in a step 414 the playback process terminates. If video controller 210 is determined to acceptable for the playback of the content of DVD disc 203 then in a step 416 the capabilities and features of video controller 210 are compared to the playback requirements of DVD disc 203 as specified in the rule set.

In a step 418 a determination is made as to whether video controller 210 can comply with the rule set of DVD disc 203. If video controller 210 cannot comply, then in a step 420 the playback process terminates. If video controller 210 can comply, then in a step 422 the content key and rules are encrypted by DVD drive 202. This encryption is done with the public key of video controller 210 which was received by DVD drive 202 in step 408 and decrypted in step 410.

In a step 424 the encrypted content key and encrypted rules are communicated to video controller 210.

In a step 426 DVD drive 202 sends compressed, encrypted content to decoder 206.

System Operation—Steps Subsequent to Key Management

Decoder 206 decompresses the compressed, encrypted data received from DVD drive 202 and transfers the decompressed, encrypted data to video controller 210. Video controller 210 decrypts the encrypted content and generates analog video signals. If the rules communicated to video controller 210 from DVD drive 202 indicate that analog protection is to be applied to the analog video signals, then analog protection is applied and the analog signals are communicated to display 224. If analog protection is not required then the analog video is communicated to display 224 without any additional processing.

Conclusion

The present invention provides a method of management and distribution of DVD copy protection cryptographic keys in both computer systems and consumer players.

An advantage of the present invention is that compressed unencrypted video data is never available outside a packaged electronic device and therefore is resistant to snooping and unauthorized copying.

It will be understood that various other changes in the details, materials, and arrangements of the parts and steps which have been described and illustrated in order to explain the nature of this invention may be made by those skilled in the art without departing from the principles and scope of the invention as expressed in the subjoined Claims.

What is claimed is:

1. A system for the secure distribution of digital content, comprising:
   a) a machine readable medium, a first portion of which is encoded with digital content encrypted under a content key, and a second portion of which is encoded out of band with a content key encrypted under a public key;
   b) a player operable to receive the machine readable medium and read the contents thereof;
   c) an information handling system coupled to the player; and
   d) a video controller coupled to the information handling system.

2. The system of claim 1, wherein the computer readable medium is a digital video disc.

3. The system of claim 1, wherein the information handling system is a personal computer.

4. The system of claim 1, wherein the information handling system is a decompressor.

5. The system of claim 4, wherein the information handling system is an MPEG decoder.

6. The system of claim 4, wherein the video display is a television.

7. The system of claim 4, wherein the video display is a computer monitor.

8. The system of claim 1, further comprising a video display coupled the video controller.

9. A method of producing a disc having secure content, the method comprising the steps of:
   a) selecting a first key;
   b) encrypting data with the first key;
   c) compressing the encrypted data;
   d) encrypting the first key with a second key;
   e) writing the compressed, encrypted data to a first portion of the disc; and
   f) writing the encrypted first key to a second portion of the disc;
   wherein the second portion of the disc is out of band.

10. The method of claim 9, wherein the first key is a symmetric key.

11. The method of claim 9, wherein the step of selecting comprises generating a random key.

12. The method of claim 9, wherein the second key is a private key of a key pair.

13. The method of claim 9, wherein the second key is a public key of a key pair.

14. The method of claim 9, wherein the step of compressing comprises MPEG encoding.

15. A method of securely converting compressed, encrypted digital video data to video signals suitable for driving a video display, comprising the steps of:
   a) within a DVD drive, decrypting at least one encrypted content key wherein decrypting includes reading an out of band portion of a disc;
   b) within the DVD drive, encrypting at least one content key with a video controller public key;
   c) communicating at least one content key encrypted with the video controller public key, from the DVD drive to a video controller;
   d) communicating compressed, encrypted video data from DVD drive to a decoder;
   e) within the decoder, decompressing the compressed, encrypted video data;
   f) communicating the encrypted video from the decoder to the video controller;
   g) within the video controller, decrypting the content key with a video controller private key; and
   h) generating and communicating video signals to the video display.

16. The method of claim 15, wherein the compressed, encrypted video data, has been compressed in accordance with an MPEG compression algorithm, and the decoder is an MPEG decoder.

17. The method of claim 15, wherein the step of decompressing comprises operating a hardware MPEG decoder.

18. The method of claim 15, wherein the step of decompressing comprises executing at least one software program on a general purpose computer.

19. The method of claim 15, further comprising the steps of:

within a DVD drive, decrypting at least one encrypted rule set;

within a DVD drive, encrypting at least one rule set the video controller public key; and communicating at least one rule set, encrypted with the video controller public key from the DVD drive to the video controller.

20. The method of claim 15, further comprising the steps of:

communicating a video controller ID from the video controller to the DVD drive;

comparing the video controller ID to a list of compromised video controllers; and disabling further communication between the DVD drive and the video controller until predetermined criteria are met.

* * * * *